(12) United States Patent
Hogenauer (10) Patent No.: US 8,949,576 B2
(45) Date of Patent: Feb. 3, 2015

(54) ARITHMETIC NODE INCLUDING GENERAL DIGITAL SIGNAL PROCESSING FUNCTIONS FOR AN ADAPTIVE COMPUTING MACHINE

(75) Inventor: Eugene B. Hogenauer, San Carlos, CA (US)

(73) Assignee: NVIDIA Corporation, Santa Clara, CA (US)

( * ) Notice: Subject to any disclaimer, the term of this patent is extended or adjusted under 35 U.S.C. 154(b) by 1918 days.

(21) Appl. No.: 10/367,188

(22) Filed: Feb. 13, 2003

(65) Prior Publication Data

US 2006/0015701 A1  Jan. 19, 2006

Related U.S. Application Data

(60) Provisional application No. 60/423,010, filed on Nov. 1, 2002.

(51) Int. Cl.
G06F 15/173 (2006.01)
G06F 15/80 (2006.01)

(52) U.S. Cl.
CPC .................... *G06F 15/8007* (2013.01)
USPC .......................................... 712/10

(58) Field of Classification Search
USPC .......................................... 712/10
See application file for complete search history.

(56) References Cited

U.S. PATENT DOCUMENTS

| | | | |
|---|---|---|---|
| 4,870,302 A * | 9/1989 | Freeman ..................... | 326/41 |
| 5,144,166 A | 9/1992 | Camarota et al. | |
| 5,218,240 A | 6/1993 | Camarota et al. | |
| 5,245,227 A | 9/1993 | Furtek et al. | |
| 5,336,950 A | 8/1994 | Popli et al. | |
| 5,450,557 A | 9/1995 | Kopp et al. | |
| 5,507,027 A * | 4/1996 | Kawamoto ..................... | 712/241 |
| 5,646,544 A | 7/1997 | Iadanza | |
| 5,737,631 A | 4/1998 | Trimberger | |
| 5,828,858 A | 10/1998 | Athanas et al. | |
| 5,889,816 A | 3/1999 | Agrawal et al. | |
| 5,892,961 A * | 4/1999 | Trimberger ..................... | 712/10 |
| 5,892,962 A * | 4/1999 | Cloutier ..................... | 712/16 |
| 5,907,580 A | 5/1999 | Cummings | |
| 5,910,733 A | 6/1999 | Bertolet et al. | |
| 5,943,242 A | 8/1999 | Vorbach et al. | |
| 5,959,881 A | 9/1999 | Trimberger et al. | |
| 5,963,048 A | 10/1999 | Harrison et al. | |
| 5,966,534 A | 10/1999 | Cooke et al. | |

(Continued)

OTHER PUBLICATIONS

Andraka Consulting Group, "Distributed Aritmetic", 1998-2000. Obtained from: "http://www.fpga-guru.com/distribu.htm".*

(Continued)

*Primary Examiner* — Robert Fennema
(74) *Attorney, Agent, or Firm* — Patterson & Sheridan, LLP (57) ABSTRACT

An apparatus for processing operations in an adaptive computing environment is provided. The adaptive computing environment including at least one processing node. A node includes a memory configured to receive and store data. The data is received from a programmable interconnection network and stored. The node also includes an execution unit configured to perform a signal processing operation. The operation is performed using data retrieved from the memory and an output result is generated. The output result may be used for further computations or sent directly to the programmable interconnection network for transfer to another processing node in the adaptive computing environment.

18 Claims, 8 Drawing Sheets

(56) References Cited

U.S. PATENT DOCUMENTS

| | | |
|---|---|---|
| 5,970,254 A | 10/1999 | Cooke et al. |
| 6,021,490 A | 2/2000 | Vorbach et al. |
| 6,023,742 A | 2/2000 | Ebeling et al. |
| 6,081,903 A | 6/2000 | Vorbach et al. |
| 6,088,043 A | 7/2000 | Kelleher et al. |
| 6,094,065 A | 7/2000 | Tavana et al. |
| 6,119,181 A | 9/2000 | Vorbach et al. |
| 6,120,551 A | 9/2000 | Law et al. |
| 6,150,838 A | 11/2000 | Wittig et al. |
| 6,230,307 B1 | 5/2001 | Davis et al. |
| 6,237,029 B1 | 5/2001 | Master et al. |
| 6,266,760 B1 | 7/2001 | DeHon et al. |
| 6,282,627 B1 | 8/2001 | Wong et al. |
| 6,338,106 B1 | 1/2002 | Vorbach et al. |
| 6,353,841 B1 | 3/2002 | Marshall et al. |
| 6,405,299 B1 | 6/2002 | Vorbach et al. |
| 6,408,039 B1 | 6/2002 | Ito |
| 6,425,068 B1 | 7/2002 | Vorbach et al. |
| 6,433,578 B1 | 8/2002 | Wasson |
| 6,480,937 B1 | 11/2002 | Vorbach et al. |
| 6,542,998 B1 | 4/2003 | Vorbach et al. |
| 6,571,381 B1 | 5/2003 | Vorbach et al. |
| 6,697,979 B1 | 2/2004 | Vorbach et al. |
| 6,751,723 B1 * | 6/2004 | Kundu et al. ................... 712/36 |
| 7,003,660 B2 | 2/2006 | Vorbach et al. |
| 7,210,129 B2 | 4/2007 | May et al. |
| 7,266,725 B2 | 9/2007 | Vorbach et al. |
| 7,394,284 B2 | 7/2008 | Vorbach |
| 7,434,191 B2 | 10/2008 | Vorbach et al. |
| 7,444,531 B2 | 10/2008 | Vorbach et al. |
| 2003/0229864 A1 * | 12/2003 | Watkins ........................... 716/4 |

OTHER PUBLICATIONS

Rajagopalan, K, Sutton, P. "A flexible multiplication unit for an FPGA logic block". May 2001, from "Circuits and Systems", vol. 4, pp. 546-549.*

Jansweijer, G. N. et al. "A Compact Robin Using the SHarc (CRUSH)". Sep. 18, 1998. Obtained from: "http://www.nikhef.nl/~peterj/Crush/CRUSH-hw.pdf".*

IA-64 Application Developer's Architecture Guide. 1999, pp. 4-24 and 4-25.*

* cited by examiner

ARITHMETIC NODE INCLUDING GENERAL DIGITAL SIGNAL PROCESSING FUNCTIONS FOR AN ADAPTIVE COMPUTING MACHINE

CROSS-REFERENCES TO RELATED APPLICATIONS

This application claims priority to provisional application 60/423,010, filed on Nov. 1, 2002, the disclosure of which is incorporated by reference in its entirety herein.

This application is related to U.S. patent application Ser. No. 09/815,122, entitled "Adaptive Integrated Circuitry with Heterogeneous and Reconfigurable Matrices of Diverse and Adaptive Computational Units having Fixed, Application Specific Computational Elements," filed on Mar. 22, 2001, which is incorporated by reference in its entirety.

BACKGROUND OF THE INVENTION

This invention is related in general to digital processing and more specifically to the design of a processing node having general digital signal processing ability for use in an adaptive computing environment.

The advances made in the design and development of integrated circuits ("ICs") have generally produced information processing devices falling into one of several distinct types or categories having different properties and functions, such as microprocessors and digital signal processors ("DSPs"), application specific integrated circuits ("ASICs"), and field programmable gate arrays ("FPGAs"). Each of these different types or categories of information processing devices have distinct advantages and disadvantages.

Microprocessors and DSPs, for example, typically provide a flexible, software programmable solution for a wide variety of tasks. The flexibility of these devices requires a large amount of instruction decoding and processing, resulting in a comparatively small amount of processing resources devoted to actual algorithmic operations. Consequently, microprocessors and DSPs require significant processing resources, in the form of clock speed or silicon area, and consume significantly more power compared with other types of devices.

ASICs, while having comparative advantages in power consumption and size, use a fixed, "hard-wired" implementation of transistors to implement one or a small group of highly specific tasks. ASICs typically perform these tasks quite effectively; however, ASICs are not readily changeable, essentially requiring new masks and fabrication to realize any modifications to the intended tasks.

FPGAs allow a degree of post-fabrication modification, enabling some design and programming flexibility. FPGAs are comprised of small, repeating arrays of identical logic devices surrounded by several levels of programmable interconnects. Functions are implemented by configuring the interconnects to connect the logic devices in particular sequences and arrangements. Although FPGAs can be reconfigured after fabrication, the reconfiguring process is comparatively slow and is unsuitable for most real-time, immediate applications. Additionally, FPGAs are very expensive and very inefficient for implementation of particular functions. An algorithmic operation implemented on an FPGA may require orders of magnitude more silicon area, processing time, and power than its ASIC counterpart, particularly when the algorithm is a poor fit to the FPGA's array of homogeneous logic devices.

One type of valuable processing is general digital signal processing (DSP). DSP operations include many different types of operations that range in complexity and resource requirements. For example, implementation of accurate filtering at high speed may require complex, dedicated hardware. Other DSP operations, such as speech processing, vocoder operations, etc., may require less speed and complexity and can be designed to be more programmable or generalized. The tradeoffs of programmability, simplicity of design, speed of execution, power consumption, cost to manufacture, etc., are all factors that contribute to the effectiveness, adaptability and profitability of the processing elements in digital systems.

Thus, there is a desire to provide general DSP functions in a processing node in an adaptive computing engine.

SUMMARY OF THE INVENTION

One embodiment of the present invention provides an apparatus for processing operations in an adaptive computing environment. The adaptive computing environment including at least one processing node.

In one embodiment, a node includes a memory configured to receive and store data. The data is received from a programmable interconnection network and stored. The node also includes an execution unit configured to perform a signal processing operation. The operation is performed using data retrieved from the memory and an output result is generated. The output result may be used for further computations or sent directly to the programmable interconnection network for transfer to another processing node in the adaptive computing environment.

Reference to the remaining portions of the specification, including the drawings and claims, will realize other features and advantages of the present invention. Further features and advantages of the present invention, as well as the structure and operation of various embodiments of the present invention, are described in detail below with respect to accompanying drawings, like reference numbers indicate identical or functionally similar elements.

DETAILED DESCRIPTION OF THE INVENTION

To address the deficiencies of prior types of information processing devices, an adaptive computing engine (ACE) architecture has been developed that provides the programming flexibility of a microprocessor, the speed and efficiency of an ASIC, and the post-fabrication reconfiguration of an FPGA. The details of this architecture are disclosed in the U.S. patent application Ser. No. 09/815,122, entitled "Adaptive Integrated Circuitry with Heterogeneous and Reconfigurable Matrices of Diverse and Adaptive Computational Units having Fixed, Application Specific Computational Elements," filed on Mar. 22, 2001, and incorporated by reference in its entirety.

Figure 1:
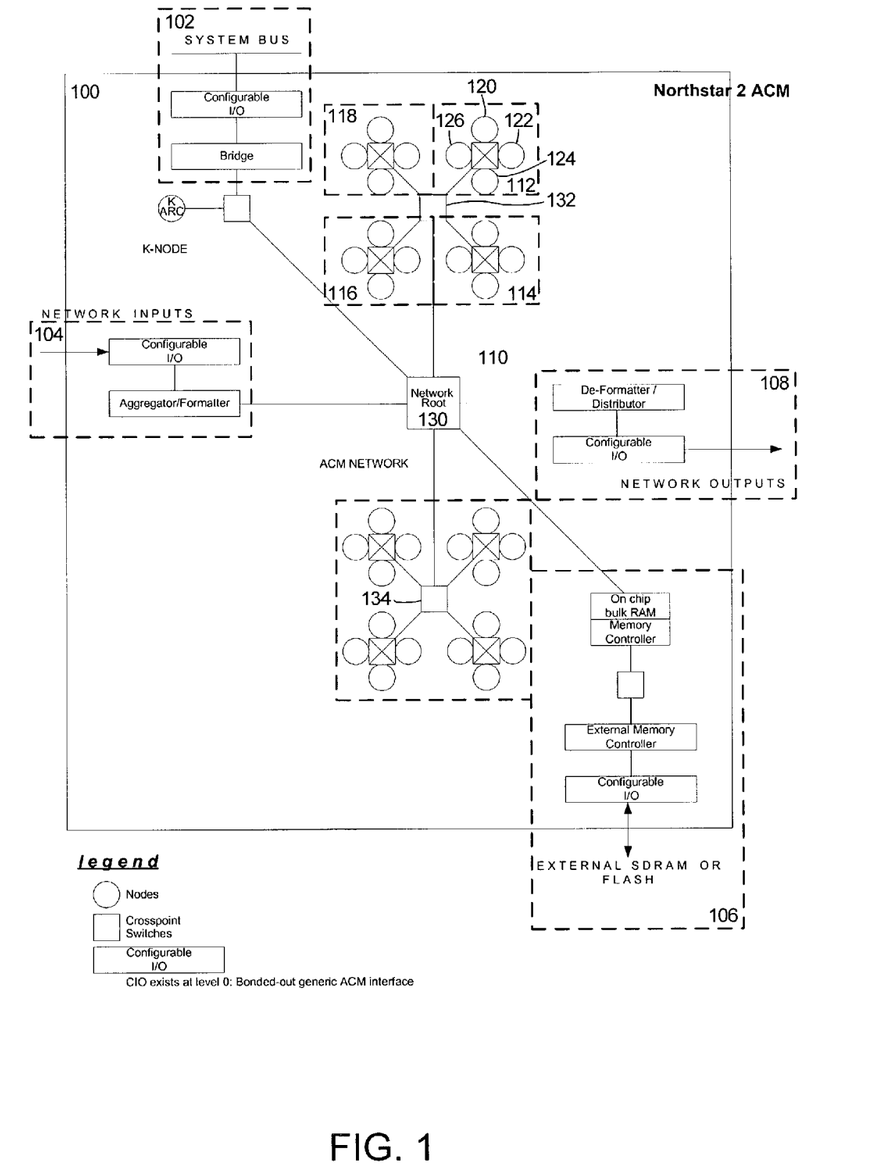
FIG. 1 illustrates an adaptive computing device according to an embodiment of the invention.

In general, the ACE architecture includes a plurality of heterogeneous computational elements coupled together via a programmable interconnection network. FIG. 1 illustrates an embodiment 100 of an ACE device. In this embodiment, the ACE device is realized on a single integrated circuit. A system bus interface 102 is provided for communication with external systems via an external system bus. A network input interface 104 is provided to send and receive real-time data. An external memory interface 106 is provided to enable this use of additional external memory devices, including SDRAM or flash memory devices. A network output interface 108 is provided for optionally communicating with additional ACE devices, as discussed below with respect to FIG. 2.

A plurality of heterogeneous computational elements (or nodes), including computing elements 120, 122, 124, and 126, comprise fixed and differing architectures corresponding to different algorithmic functions. Each node is specifically adapted to implement one of many different categories or types of functions, such as internal memory, logic and bit-level functions, arithmetic functions, control functions, and input and output functions. The quantity of nodes of differing types in an ACE device can vary according to the application requirements.

Because each node has a fixed architecture specifically adapted to its intended function, nodes approach the algorithmic efficiency of ASIC devices. For example, a binary logical node may be especially suited for bit-manipulation operations such as, logical AND, OR, NOR, XOR operations, bit shifting, etc. An arithmetic node may be especially well suited for math operations such as addition, subtraction, multiplication division, etc. Other types of nodes are possible that can be designed for optimal processing of specific types.

Programmable interconnection network 110 enables communication among a plurality of nodes, and interfaces 102, 104, 106, and 108. By changing the number and order of connections between various nodes, the programmable interconnection network is able to quickly reconfigure the ACE device for a variety of different tasks. For example, merely changing the configuration of the interconnections between nodes allows the same set of heterogeneous nodes to implement vastly different functions, such as linear or non-linear algorithmic operations, finite state machine operations, memory operations, bit-level manipulations, fast Fourier or discrete cosine transformations, and many other high level processing functions for advanced computing, signal processing, and communications applications.

In one embodiment, programmable interconnection network 110 comprises a network root 130 and a plurality of crosspoint switches, including switches 132 and 134. In one embodiment, programmable interconnection network 110 is logically and/or physically arranged as a hierarchical tree to maximize distribution efficiency. In this embodiment, a number of nodes can be clustered together around a single crosspoint switch. The crosspoint switch is further connected with additional crosspoint switches, which facilitate communication between nodes in different clusters. For example, cluster 112, which comprises nodes 120, 122, 124, and 126, is connected with crosspoint switch 132 to enable communication with the nodes of clusters 114, 116, and 118. Crosspoint switch is further connected with additional crosspoint switches, for example crosspoint switch 134 via network root 130, to enable communication between any of the plurality of nodes in ACE device 100.

Figure 2:
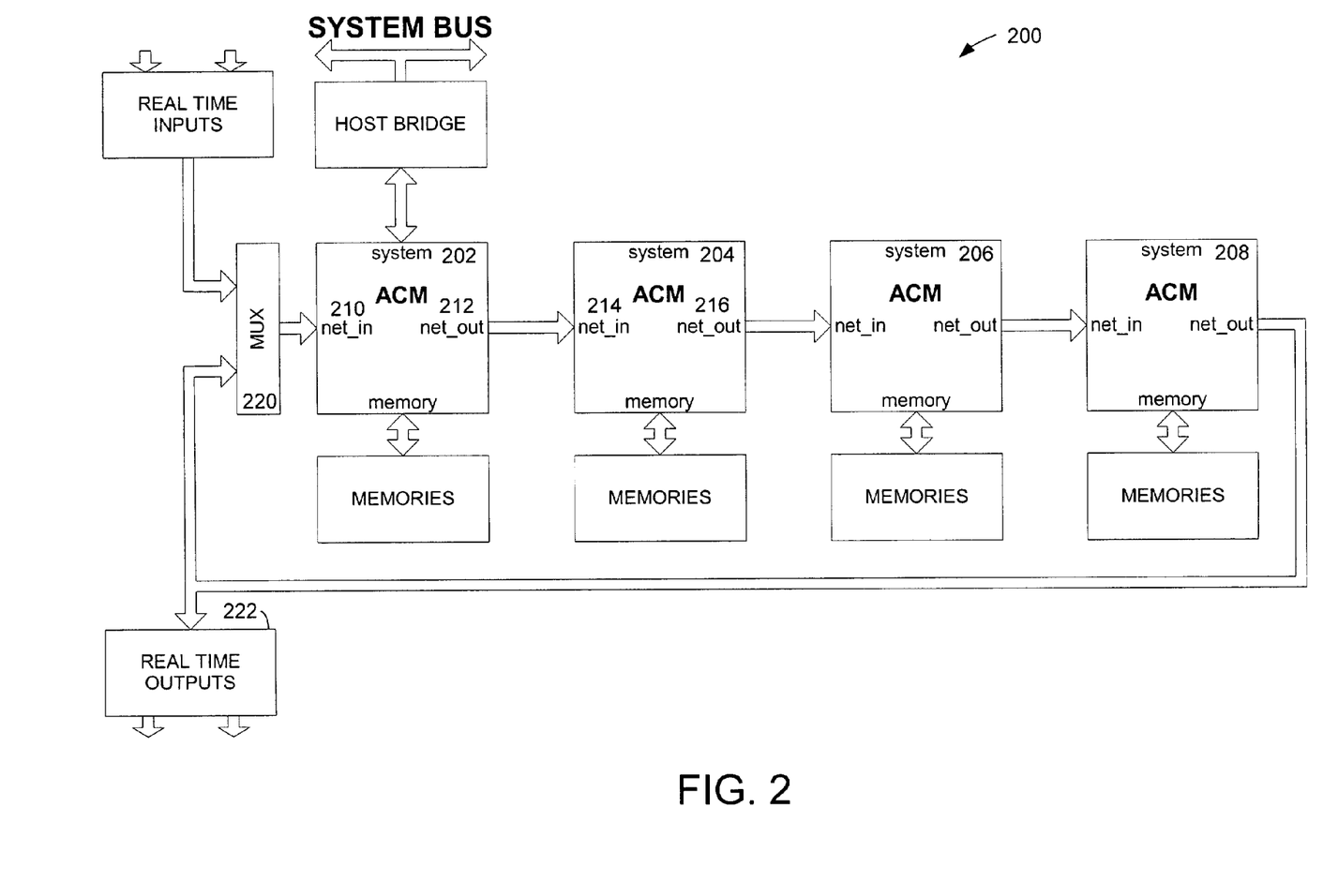
FIG. 2 illustrates a system of adaptive computing devices according to an embodiment of the invention.

The programmable interconnection network (PIN) 110, in addition to facilitating communications between nodes within ACE device 100, also enables communication with nodes within other ACE devices. FIG. 2 shows a plurality of ACE devices 202, 204, 206, and 208, each having a plurality of nodes, connected together in a development system 200. The system bus interface of ACE device 202 communicates with external systems via an external system bus. Real-time input is communicated to and from ACE device 202 via a network input interface 210. Real-time inputs and additional data generated by ACE device 202 can be further communicated to ACE device 204 via network output interface 212 and network input interface 214. ACE device 204 communicates real-time inputs and additional data generated by either itself or ACE device 202 to ACE device 206 via network output interface 216. In this manner, any number of ACE devices may be coupled together to operate in parallel. Additionally, the network output interface 218 of the last ACE device in the series, ACE device 208, communicates real-time data output and optionally forms a data feedback loop with ACE device 202 via multiplexer 220.

As indicated above, there is a desire for a node in an adaptive computing engine (ACE) adapted to perform digital signal processing functions. In accordance with embodiments of the present invention, an arithmetic node (AN) including digital signal processing functions fulfills these requirements and integrates seamlessly with other types of nodes in the ACE architecture.

Figure 3:
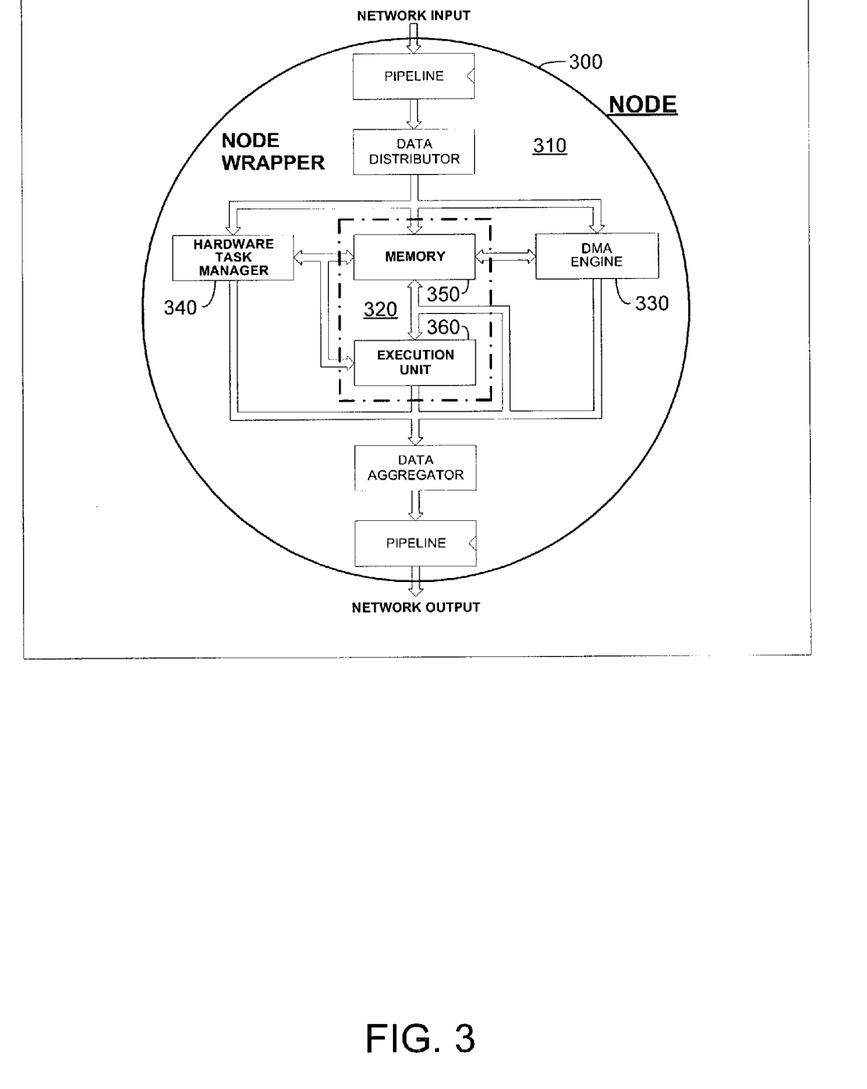
FIG. 3 illustrates a node of an adaptive computing device according to an embodiment of the invention.

FIG. 3 is a block diagram illustrating the general internal structure of a node for use in a ACE. Node 300 can be any type of node, including a node for internal memory, logic and bit-level functions, arithmetic functions, control functions, input and output functions, or an AN according to embodiments of the present invention. Node 300 includes a node wrapper 310 to facilitate communications with the programmable interconnection network 110. Node wrapper 310 receives data and configuration information from the programmable interconnection network and distributes information as appropriate to the node core 320. Node wrapper 310 also collects information from the node core 320 and sends it to other nodes or external devices via programmable interconnection network 110.

Figure 5:
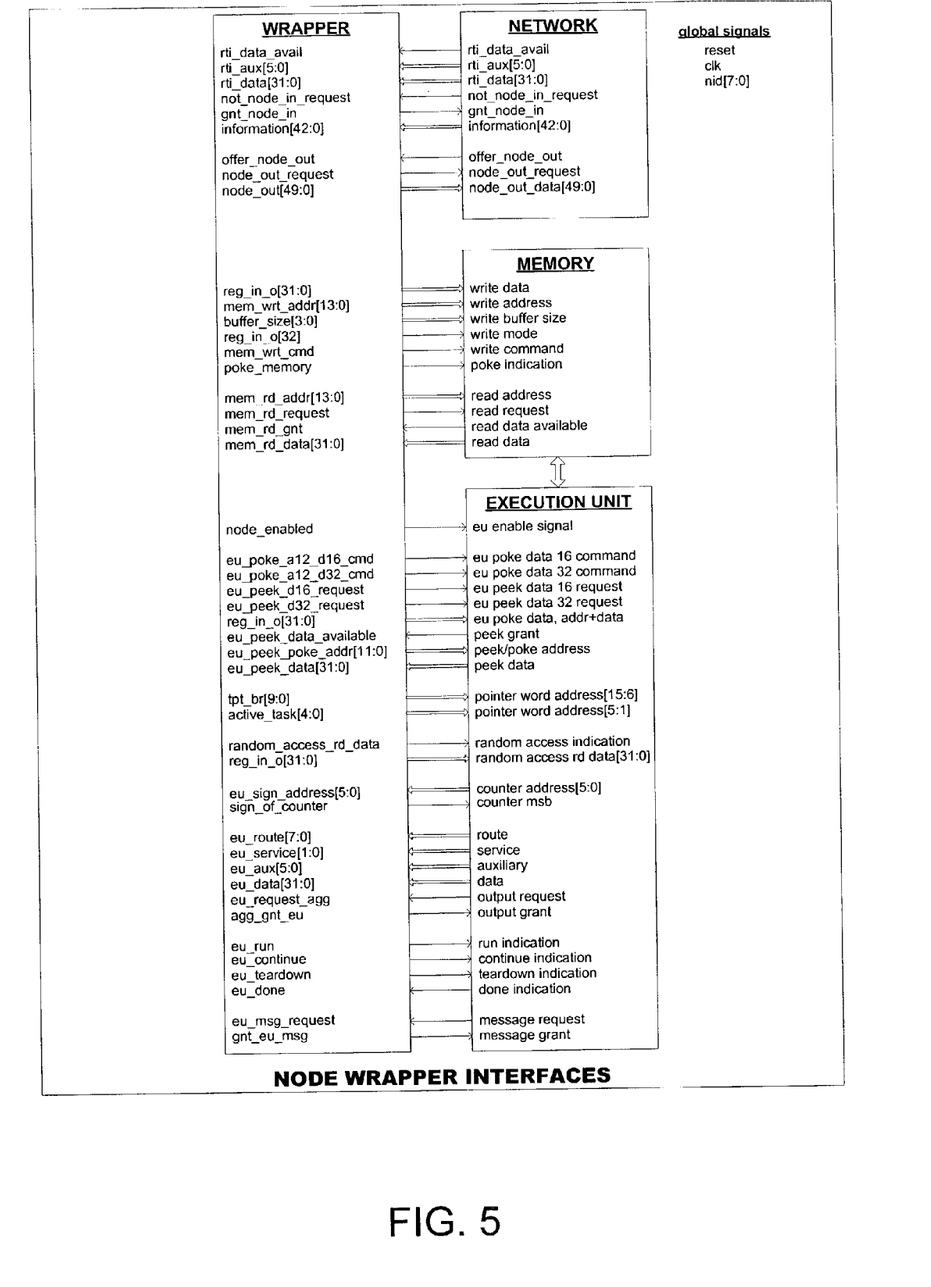
FIG. 5 illustrates the node wrapper interface according to an embodiment of the invention.

For receiving information, the node wrapper 310 includes a pipeline unit and a data distribution unit. For sending data, the node wrapper 310 includes a data aggregator unit and a pipeline unit. Node wrapper 310 also includes a hardware task manager 340 and a DMA engine 330 that coordinates direct memory access (DMA) operations. FIG. 5 shows the node wrapper interface in more detail.

The node core 320 is specific to the intended function of the node. Generally, the node core 320 includes node memory 350 and an execution unit 360. Node memory 350 serves as local storage for node configuration information and data processed by the node. Execution unit 360 processes data to perform the intended function of the node. The size and format of node memory 350 and the internal structure of the execution unit 360 are specific to the intended function of the node. For the AN of the present invention, the execution unit 360 and the node memory 350 are designed as discussed below for digital signal processing functions.

Figure 4:
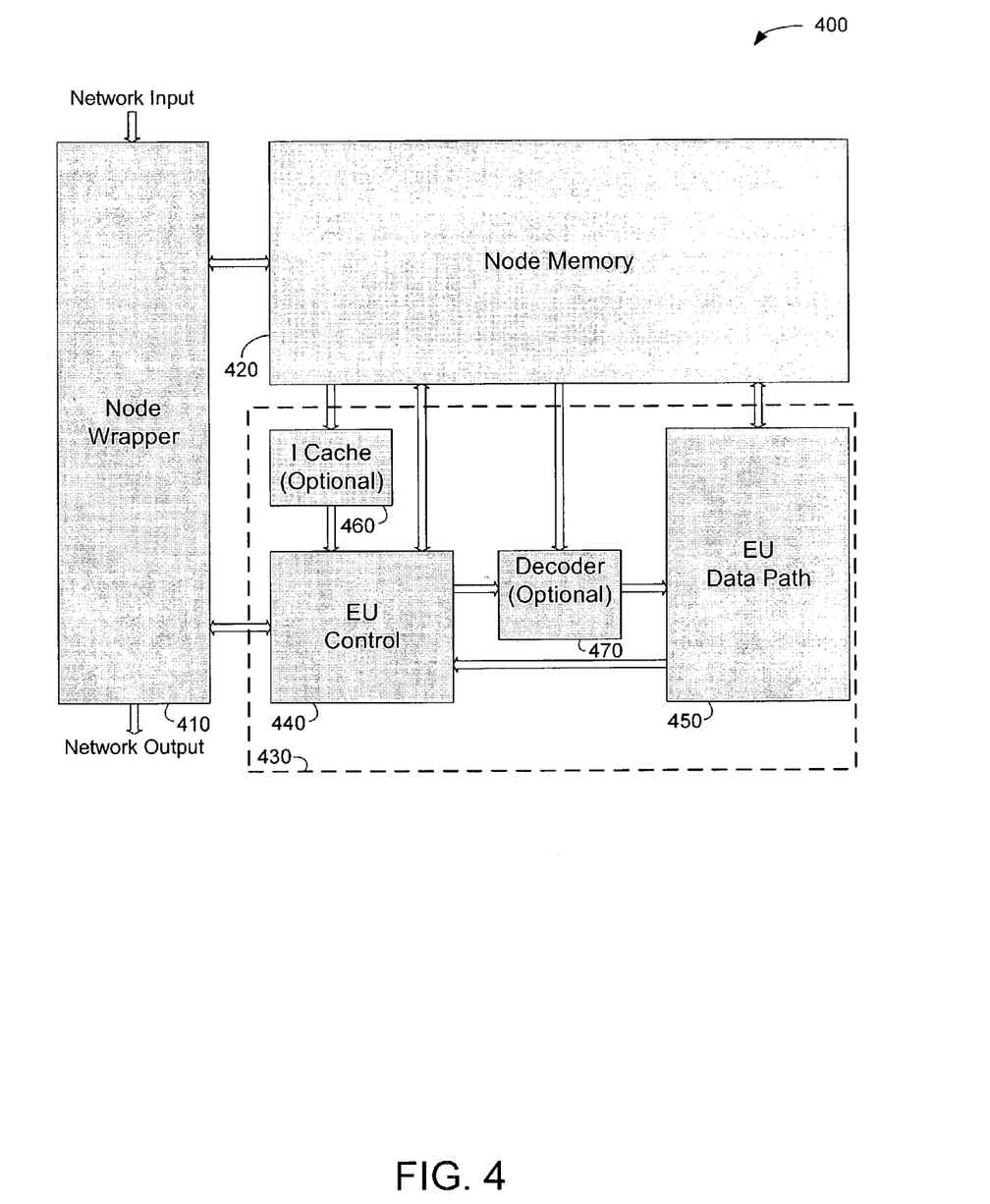
FIG. 4 illustrates the internal structure of a node according to an embodiment of the invention.

FIG. 4 illustrates a block diagram of a node 400 showing the connections between the node wrapper 410, node memory 420, and the execution unit 430. Execution unit 430 includes an execution unit controller 440 for controlling the functions of the execution unit, an optional instruction cache 460 for temporarily storing instructions to the execution unit controller 440, an optional decoder 470, and an execution data path 450 for processing data under the supervision of the execution unit controller 440.

Figure 6:
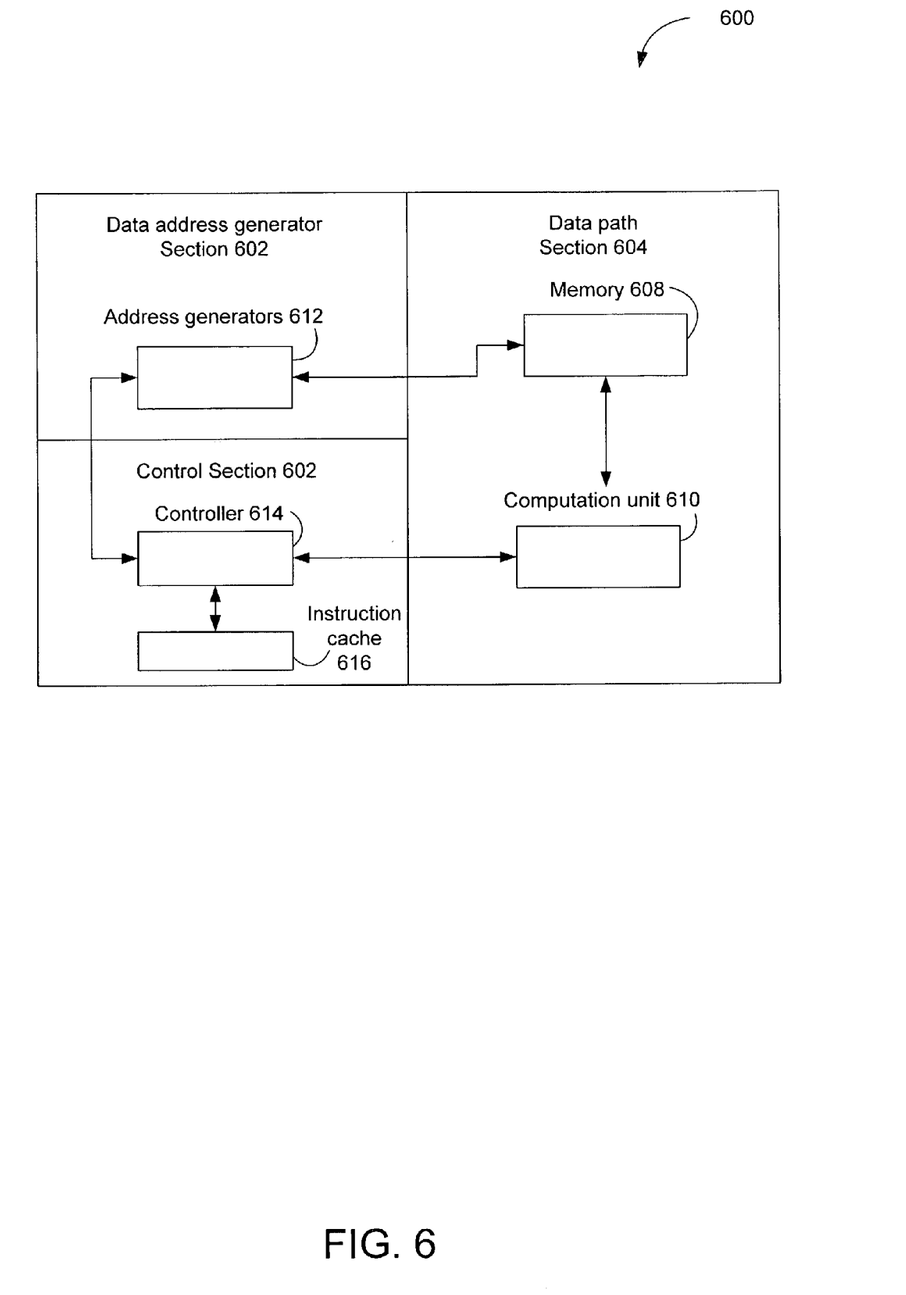
FIG. 6 depicts a simplified block diagram of an arithmetic node according to one embodiment of the present invention.

FIG. 6 depicts a simplified block diagram 600 of an arithmetic node according to one embodiment of the present invention. Arithmetic node (AN) 600 includes a data address generator section 602, a data path section 604, and a control section 606. As mentioned above, AN 600 is one of several nodes in an ACE device. The nodes in the ACE device are heterogeneous nodes where different nodes perform different applications.

Data path section 604 includes a memory 608 and a computation unit 610. Memory 608 is configured to store data that is received from programmable interconnection network 110. The stored data is used by computation unit 610 to perform processing operations such as digital signal processing operations. Computation unit 610 may be any unit that performs computations. For example, computation unit 610 may be an arithmetic logic unit/multiply accumulate (ALU/MAC). An ALU/MAC unit may perform a multiply and accumulate operation in a single instruction.

Data address generator section 602 includes one or more address generators 612. Address generator 612 generates addresses for data to be stored in memory 608. Also, address generator 612 generates addresses for data that is to be retrieved from memory 608. For example, when data is received at AN 600, data address generator 612 generates an address where that data will be stored in memory 608. Also, when computation unit 610 requires data from memory 608 in order to perform a processing operation, address generator 612 generates an address where that data is stored in memory 608.

In one embodiment, address generator 612 generates a unique sequence of addresses for storing data in memory so that the control section 606 and data path section 604 do not need to know the address for operands in a processing operation.

Control section 606 includes a controller 614 and an instruction cache 615. Controller 614 is used to control the operation of computation unit 610 and the data address generator 612. Controller 614 determines an instruction to execute from instruction cache 616 and signals address generator 612 to generate an address for the operands for the instruction. Address generator 612 generates the address to retrieve the operands from memory 608 and controller 614 sends the instruction to computation unit 610. The instruction is then performed when the operands are received from memory 608. Controller 614 is also used for branching and computing the next value of a program counter of AN 600.

Figure 7:
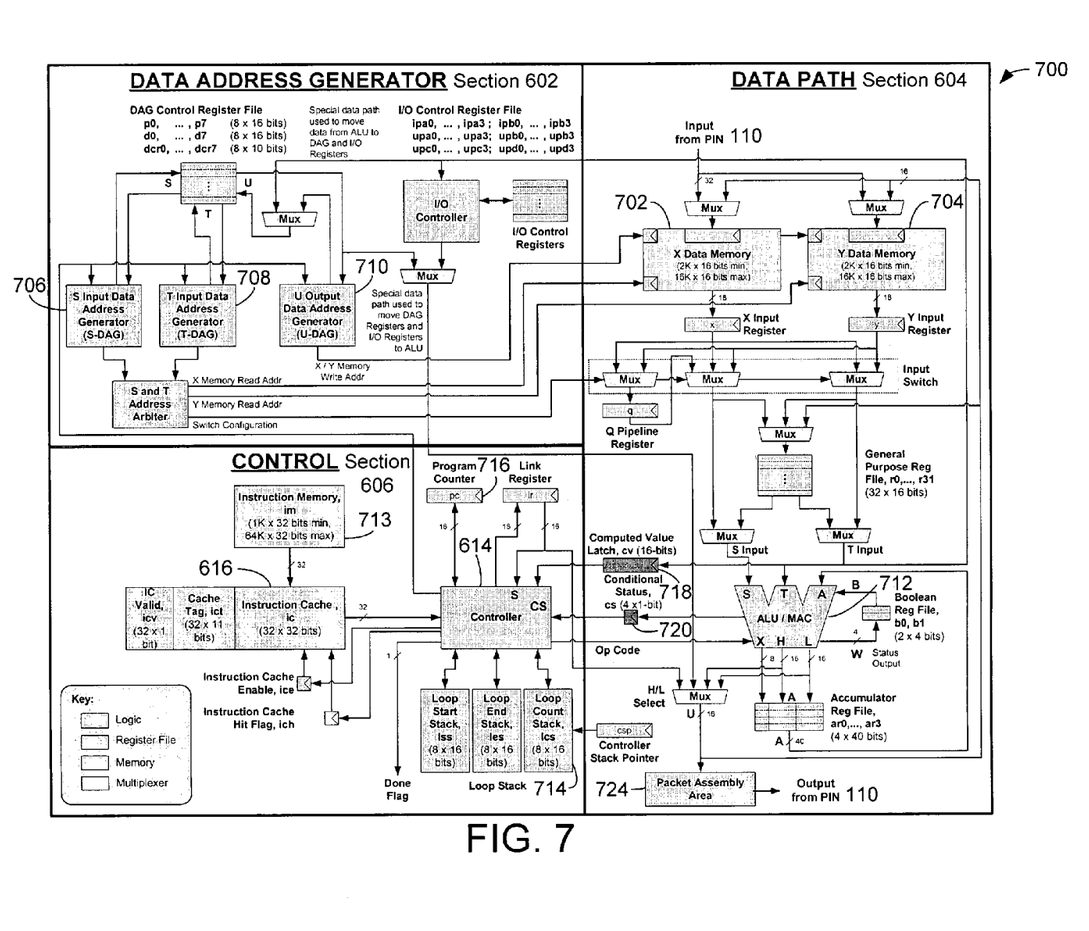
FIG. 7 illustrates a more detailed block diagram of an arithmetic node according to one embodiment of the present invention.

FIG. 7 illustrates a more detailed block diagram of an arithmetic node 700 according to one embodiment of the present invention. As shown, AN 700 includes data address generator 602, data path section 604, and control section 606.

Data path section 604 includes an X data memory 702 and a Y data memory 704. Data is received from programmable interconnection network (PIN) 110 and routed to X data memory 702 or Y data memory 704. Dual data memories (X data memory 702 and Y data memory 704) are provided in data path section 604 to allow for simultaneous reading of two operands for use by the ALU/MAC 712 as part of the same instruction. In addition, the dual memories allow the simultaneous writing of one data value received from the programmable interconnection network 110 and another value computed by the ALU/MAC 712.

The matrix interconnection network 110, and its subset interconnection networks separately illustrated (Boolean interconnection network, data interconnection network, and interconnect), collectively and generally referred to herein as "interconnect", "interconnection(s)" or "interconnection network(s)", may be implemented generally as known in the art, such as utilizing FPGA interconnection networks or switching fabrics, albeit in a considerably more varied fashion. In the preferred embodiment, the various interconnection networks are implemented as described, for example, in U.S. Pat. No. 5,218,240, U.S. Pat. No. 5,336,950, U.S. Pat. No. 5,245, 227, and U.S. Pat. No. 5,144,166, and also as discussed below. These various interconnection networks provide selectable (or switchable) connections between and among the controller, the memory, the various nodes, and the computational units and computational elements, providing the physical basis for the configuration and reconfiguration referred to herein, in response to and under the control of configuration signaling generally referred to herein as "configuration information". In addition, the various interconnection networks provide selectable or switchable data, input, output, control and configuration paths, between and among the controller, the memory, the various nodes, and the computational units and computational elements, in lieu of any form of traditional or separate input/output busses, data busses, DMA, RAM, configuration and instruction buses.

It should be pointed out, however, that while any given switching or selecting operation of or within the various interconnection networks may be implemented as known in the art, the design and layout of the various interconnection networks, in accordance with the present invention, are new and novel, as discussed in greater detail below. For example, varying levels of interconnection are provided to correspond to the varying levels of the nodes, the computation units, and the computational elements, discussed below. At the node level, in comparison with the prior art FPGA interconnect, the interconnection network 110 is considerably more limited and less "rich", with lesser connection capability in a given area, to reduce capacitance and increase speed of operation.

Within a computation unit are a plurality of computational elements and additional interconnect. The additional interconnect provides the reconfigurable interconnection capability and input/output paths between and among the various computational elements. As indicated above, each of the various computational elements consist of dedicated, application specific hardware designed to perform a given task or range of tasks, resulting in a plurality of different, fixed computational elements. Utilizing the additional interconnect, the fixed computational elements may be reconfigurably connected together into adaptive and varied computational units, which also may be further reconfigured and interconnected, to execute an algorithm or other function, at any given time.

Forming the conceptual data and Boolean interconnect networks, the exemplary computation unit also includes a plurality of input multiplexers, a plurality of input lines (or wires), and for the output of the CU core, a plurality of output demultiplexers and a plurality of output lines (or wires). Through the input multiplexers, an appropriate input line may be selected for input use in data transformation and in the configuration and interconnection processes, nd through the output demultiplexers, an output or multiple outputs may be placed on a selected output line, also for use in additional data transformation and in the configuration and interconnection processes.

In the preferred embodiment, the selection of various input and output lines, and the creation of various connections through the interconnect, is under control of control bits, such as from the computational unit controller, as discussed below. Based upon these control bits, any of the various input enables, input selects, output selects, MUX selects, DEMUX enables, DEMUX selects, and DEMUX output selects, may be activated or deactivated.

The exemplary computation unit controller provides control, through control bits, over what each computational element, interconnect, and other elements (above) does with every clock cycle. Not separately illustrated, through the interconnect, the various control bits are distributed, as may be needed, to the various portions of the computation unit, such as the various input enables, input selects, output selects, MUX selects, DEMUX enables, DEMUX selects, and DEMUX output selects. The controller also includes one or more lines for reception of control (or configuration) information and transmission of status information.

An S input data address generator (S-DAG) 706 and the a T input data address generator (T-DAG) 708 compute addresses in X and/or Y data memories 702 and 704. The values at these addresses are read from the memories 702 and 704 and sent to ALU/MAC 712 as input operands S and T respectively. Data address generator section 602 also includes a U output data address generator (U-DAG) 710 that is used to calculate a write address where data will be written back into X memory 702 or Y memory 704 as a result of an ALU/MAC operation. For example, when the ALU/MAC 712 needs data to perform a processing operation, S-DAG 706 calculates the address where the S input operand may be retrieved from X memory 702 or Y data memory 704. Similarly, T-DAG 708 calculates an address where the T input operand may be retrieved from X memory 702 or Y data memory 704. If the two reads are from different memories, then the two reads may be performed simultaneously. If both reads, however, are from the same memory, the operation is stalled until both operands can be read. The data is then routed from X data memory 702 and/or Y data memory 704 to ALU/MAC 712, which processes the operands. The result may be written back into X memory 702 or Y memory 704 at the write address computed by the U-DAG 710. Alternately, results of an ALU/MAC 712 operation may be written out to PIN 110 rather than being written to X data memory 702 or Y data memory 704. In this case, PIN 110 sends the results directly to the memory of another heterogeneous node in the ACE device for further processing or for output.

Control section 606 includes controller 614, instruction cache 616, and instruction memory 713. Instruction memory 713 is an instruction store for instructions. Instruction cache 616 stores one or more instructions from instruction memory 713.

Controller 614 determines the next instruction address and provides the resulting instruction to data address generator section 602 and data path section 604. In one embodiment, instructions are executed sequentially so the job of controller 614 is simply to increment a program counter 716. However, when a branch instruction is encountered, the next instruction is determined by a number of factors. If the instruction is an unconditional branch then the branch address is specified by an immediate field in the instruction itself or by the value of a computed value latch 718. If the branch instruction is conditional, then whether the branch is taken or execution continues sequentially is determined by the Boolean value of a conditional status latch 720. Both computed value latch 718 and conditional status latch 720 are set by previous operations performed by ALU/MAC 712.

Controller 614 also determines the sequencing for loop instructions. When a loop instruction is encountered, the following information is pushed onto loop stack 714: (1) the instruction address at the start of the loop, (2) the instruction address at the end of the loop, and (3) the number of loop iterations. When the value of program counter 716 is equal to the address at the end of the loop, then the number of iterations is checked to determine if the loop should continue at the start of the loop or to break out of the loop and continue sequentially. When the end of the loop is reached, loop stack 714 is popped and the next higher loop in the stack becomes active. The end-of-loop checking proceeds in parallel with normal instruction execution resulting in zero overhead looping. In one embodiment, loop stack 714 has a depth of eight allowing for up to eight nested loops.

Once the program counter 716 has been updated, logic in instruction cache determines if the instruction is currently in instruction cache 616. If it is present, the corresponding instruction is retrieved from instruction cache 616, otherwise, it is retrieved from instruction memory 714. The instruction cache in this embodiment holds up to 32 instructions. This is seen as being large enough to contain the inner loops of a wide class of digital signal processing algorithms without the need to retrieve instructions from the more power hungry instruction memory 713.

AN 700 is configured to be compatible with PIN 110. Thus, AN 700 is adapted to receive data directly from PIN 110 and store the data in memory 702 or 704. Once the processing of the data has been performed by ALU/MAC 712, the data is outputted directly to PIN 110. PIN 110 is then configured to send the data to another heterogeneous computational unit in the ACE device.

The input/output operations are embedded into the instruction set of AN 700 Most arithmetic instructions have an option for outputting directly to the PIN 110. As a result, output is accomplished with little or no overhead. When this option is used, the results of an ALU/MAC operation are sent to a packet assembly area 724 along with a logical output port number. In one embodiment, packet assembly area 724 saves enough data to form a packet, such as 32-bit packet, for the specified output port and then uses preconfigured tables to direct the assembled data to a specific input port on a specific node.

In addition to these zero overhead output operations, the instruction set of AN 700 allows for the transmission of various types of acknowledgement messages on PIN 110. These messages are used for flow control indicated as destination nodes that data is available and indicate to source nodes that data has been consumed.

The handling of input to AN 700 is handled primarily by node wrapper 310, which controls the storing of input data received from PIN 110 and the sequencing of tasks performed by AN 700. Node wrapper 310 is also responsible for processing acknowledgment messages received from other nodes.

Figure 8:
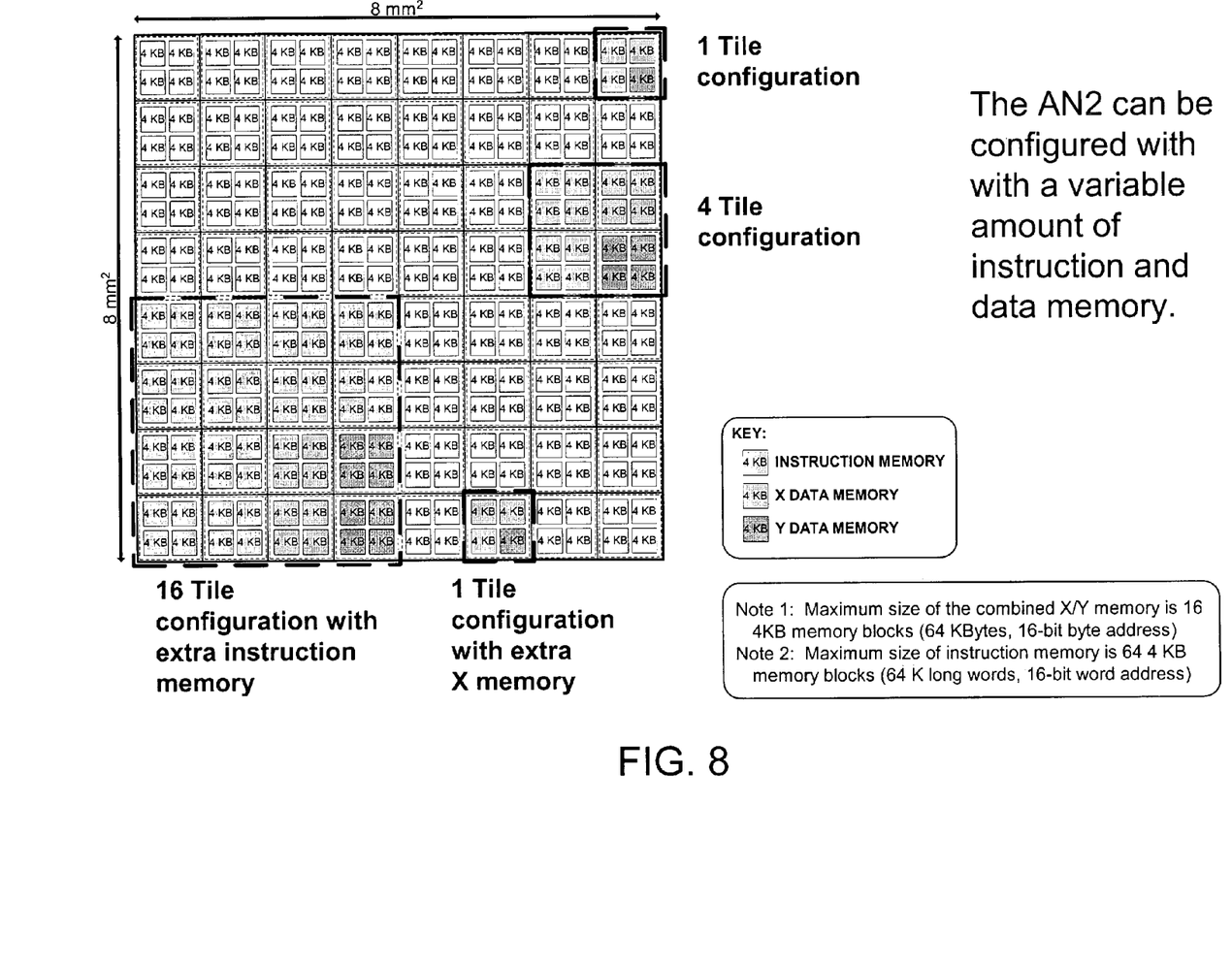
FIG. 8 illustrates an embodiment of a memory architecture for an arithmetic node.

FIG. 8 illustrates an embodiment of a memory architecture for an arithmetic node. An arithmetic node may be configured with a variable amount of instruction data memory. As shown, each arithmetic node includes memory in the form of a tile. A tile may include 16 K bytes of memory in four sections of 4 K bytes in one embodiment. In another embodiment, a tile may include different amounts of memory and embodiment of the preset invention are not restricted to the stated amounts. The arithmetic node may have memory in a one tile configuration, a four file configuration, a sixteen tile configuration, etc. The amount of memory varies depending on the arithmetic node that the memory is associated with. Additionally, additional memory may be adapted for a tile if the arithmetic node needs additional memory during processing. In this case, a tile may be expanded to include more memory than was originally allocated for the node.

The above description is illustrative but not restrictive. Many variations of the invention will become apparent to those skilled in the art upon review of the disclosure. The scope of the invention should, therefore, be determined not with reference to the above description, but instead should be determined with reference to the pending claims along with their full scope or equivalents.

What is claimed is:

1. An adaptive computing engine, comprising:
a programmable interconnection network including a network root and a set of crosspoint switches, each crosspoint switch coupled to the network root, wherein the network root and the set of crosspoint switches can be programmed to configure the adaptive computing engine for one or more different tasks; and
a plurality of nodes that each have a fixed and different architecture that corresponds to a particular algorithmic function, wherein each node is connected to one or more other nodes in the plurality of nodes by at least one crosspoint switch in the set of crosspoint switches, each node including:
an execution unit configured to perform the particular algorithmic function associated with the node, the execution unit having an internal structure specific to the particular algorithmic function associated with the node,
a memory configured to receive data and to store data, the memory having a size and a memory format, and
a node wrapper configured to:
receive data and configuration information from the programmable interconnection network,
distribute the data and configuration information received from the interconnection network to the execution unit and to the memory,
receive data from the execution unit and from the memory, and
transmit the data received from the execution unit and from the memory to other nodes in the plurality of nodes and to one or more processing elements external to the adaptive computing engine via the programmable interconnection network.

2. The adaptive computing engine of claim 1, wherein each node in the plurality of nodes further includes:
an instruction cache configured to store one or more instructions and one or more operands; and
a controller configured to control the operation of the execution unit and the address generator by performing the steps of:
retrieving an instruction from the instruction cache,
causing the address generator to generate an address for the instruction cache at which one or more operands associated with the instruction are stored,
retrieving the one or more operands from the memory based on the address, and
transmitting the instruction and the one or more operands to the execution unit for execution.

3. The adaptive computing engine of claim 2, wherein the controller retrieves one or more instructions from sequential addresses in the instruction cache until a branch instruction is retrieved from the instruction cache.

4. The adaptive computing engine of claim 3, wherein the branch instruction is an unconditional branch instruction including a branch address specifying a location in the instruction cache of a subsequent instruction to be executed that is based on a value stored in a computed value latch that is set during execution of a previous instruction.

5. The adaptive computing engine of claim 3, wherein the branch instruction is a conditional branch instruction, the controller continues to retrieve instructions from sequential addresses in the instruction cache according to a binary value stored in a conditional status latch that is set during execution of a previous instruction.

6. The adaptive computing engine of claim 1, configured to execute an instruction loop, the adaptive computing engine comprising:
a loop stack configured to receive an address of a start instruction in the instruction cache, an address of an end instruction in the instruction cache, and a maximum number of loop iterations; and
a program counter configured to record a current number of loop iterations, wherein the loop stack is popped and a subsequent instruction loop is executed when the maximum number of loop iterations is equal to the current number of loop iterations.

7. The adaptive computing engine of claim 1, further comprising:
a system bus interface configured to provide communication with one or more computer systems;
a network input interface configured to send and receive real-time data;
an external memory interface configured to be coupled to one or more external memory devices; and
a network output interface configured to provide communication with one or more other adaptive computing engines.

8. The adaptive computing engine of claim 7, wherein the adaptive computing engine is coupled to one or more other adaptive computing engines that are connected in a sequence, and the last other adaptive computing engine in the sequence includes a feedback connection to the adaptive computing engine.

9. The adaptive computing engine of claim 1, wherein the programmable interconnection network is configured to cause the plurality of nodes to implement a linear algorithmic operation, a non-linear algorithmic operation, a finite state machine operation, a memory operation, a bit manipulation, a fast Fourier transform, an arithmetic logic function, a multiply-accumulate function, or a discrete cosine transformation.

10. A computing system, comprising a first adaptive computing engine and a second adaptive computing engine, wherein the first adaptive computing engine and the second adaptive computing engine each comprise:
a programmable interconnection network including a network root and a set of crosspoint switches, each crosspoint switch coupled to the network root, wherein the network root and the set of crosspoint switches can be programmed to configure the adaptive computing engine for one or more different tasks; and
a plurality of nodes that each have a fixed and different architecture that corresponds to a particular algorithmic function, wherein each node is connected to one or more other nodes in the plurality of nodes by at least one crosspoint switch in the set of crosspoint switches, each node including:
an execution unit configured to perform the particular algorithmic function associated with the node, the execution unit having an internal structure specific to the particular algorithmic function associated with the node,
a memory configured to receive data and to store data, the memory having a size and a memory format, and a node wrapper configured to:
receive data and configuration information from the programmable interconnection network,
distribute the data and configuration information received from the interconnection network to the execution unit and to the memory,
receive data from the execution unit and from the memory, and
transmit the data received from the execution unit and from the memory to other nodes in the plurality of nodes and to one or more processing elements external to the adaptive computing engine via the programmable interconnection network.

11. The computing system of claim 10, wherein each node in the plurality of nodes further includes:
an instruction cache configured to store one or more instructions and one or more operands; and
a controller configured to control the operation of the execution unit and the address generator by performing the steps of:
retrieving an instruction from the instruction cache,
causing the address generator to generate an address for the instruction cache at which one or more operands associated with the instruction are stored,
retrieving the one or more operands from the memory based on the address, and
transmitting the instruction and the one or more operands to the execution unit for execution.

12. The computing system of claim 11, wherein the controller retrieves one or more instructions from sequential addresses in the instruction cache until a branch instruction is retrieved from the instruction cache.

13. The computing system of claim 12, wherein the branch instruction is an unconditional branch instruction including a branch address specifying a location in the instruction cache of a subsequent instruction to be executed that is based on a value stored in a computed value latch that is set during execution of a previous instruction.

14. The computing system of claim 12, wherein the branch instruction is a conditional branch instruction, the controller continues to retrieve instructions from sequential addresses in the instruction cache according to a binary value stored in a conditional status latch that is set during execution of a previous instruction.

15. The computing system of claim 10, configured to execute an instruction loop, the adaptive computing engine comprising:
a loop stack configured to receive an address of a start instruction in the instruction cache, an address of an end instruction in the instruction cache, and a maximum number of loop iterations; and
a program counter configured to record a current number of loop iterations, wherein the loop stack is popped and a subsequent instruction loop is executed when the maximum number of loop iterations is equal to the current number of loop iterations.

16. The computing system of claim 10, wherein the first adaptive computing engine and the second adaptive computing engine each further include:
a system bus interface configured to provide communication with one or more computer systems;
a network input interface configured to send and receive real-time data;
an external memory interface configured to be coupled to one or more external memory devices; and
a network output interface configured to provide communication with one or more other adaptive computing engines.

17. The computing system of claim 16, wherein the network output interface included in the first adaptive computing engine is coupled to the network input interface of the second adaptive computing engine, and the network output interface included in the second adaptive computing engine is coupled to the network input interface of the first adaptive computing engine comprising a feedback connection from the second adaptive computing engine to the first adaptive computing engine.

18. The computing system of claim 10, wherein the programmable interconnection network is configured to cause the plurality of nodes to implement a linear algorithmic operation, a non-linear algorithmic operation, a finite state machine operation, a memory operation, a bit manipulation, a fast Fourier transform, an arithmetic logic function, a multiply-accumulate function, or a discrete cosine transformation.

* * * * *